United States Patent
Cohen et al.

(10) Patent No.: US 10,187,637 B2
(45) Date of Patent: Jan. 22, 2019

(54) INDUCTIVE MICRO-CONTRAST EVALUATION METHOD

(71) Applicant: Filmic Inc., Seattle, WA (US)

(72) Inventors: Christopher Cohen, Seattle, WA (US); Matthew Voss, Seattle, WA (US)

(73) Assignee: FILMIC INC., Seattle, WA (US)

( * ) Notice: Subject to any disclaimer, the term of this patent is extended or adjusted under 35 U.S.C. 154(b) by 0 days.

(21) Appl. No.: 15/910,989

(22) Filed: Mar. 2, 2018

(65) Prior Publication Data
US 2018/0262752 A1    Sep. 13, 2018

Related U.S. Application Data

(60) Provisional application No. 62/468,063, filed on Mar. 7, 2017, provisional application No. 62/468,874, filed on Mar. 8, 2017.

(51) Int. Cl.
*H04N 17/00* (2006.01)
*H04N 5/232* (2006.01)
*G06T 7/90* (2017.01)

(52) U.S. Cl.
CPC .............. *H04N 17/002* (2013.01); *G06T 7/90* (2017.01); *G06T 2207/10016* (2013.01); *G06T 2207/10024* (2013.01); *H04N 5/23293* (2013.01)

(58) Field of Classification Search
CPC ...... H04N 17/00; H04N 17/02; H04N 17/002; H04N 5/23293; H04N 5/2352; H04N 5/208; H04N 5/272; H04N 9/045; H04N 5/232; H04N 5/235; G06T 7/90;
(Continued)

(56) References Cited

U.S. PATENT DOCUMENTS

| 5,496,106 A | 3/1996 | Anderson |
| 6,075,875 A | 6/2000 | Gu |
| 6,996,549 B2 | 2/2006 | Zhang et al. |

(Continued)

FOREIGN PATENT DOCUMENTS

| WO | 2017139367 | 8/2017 |
| WO | 2017175231 | 10/2017 |

OTHER PUBLICATIONS

Vanbrabant, P., et al., "Optical Analysis of Small Pixel Liquid Crystal Microdisplays," Journal of Display Technology, Mar. 2011, 7(3): 156-161.

*Primary Examiner* — Sherrie Hsia
(74) *Attorney, Agent, or Firm* — Davis Wright Tremaine LLP; Heather M. Colburn

(57) ABSTRACT

A method and system for visualizing micro-contrast. At least one processor obtains a selected root image from a digital video, generates an assistive image, and blends the assistive image with the selected root image to obtain a mutated image, which configured to be displayed by a display device. The selected root image includes root pixels each associated with color values. The assistive image is generated based on a plurality of micro-contrast scores comprising a micro-contrast score calculated for each of at least a portion of the root pixels. The micro-contrast score is calculated for a selected one of the root pixels by identifying a submatrix centered at the selected root pixel, and calculating the micro-contrast score for the selected root pixel based on the color values associated with only sample pixels positioned one each at corners of the submatrix.

19 Claims, 4 Drawing Sheets

(58) Field of Classification Search
CPC . G06T 2207/10016; G06T 2207/10024; G06T 5/001; G06T 5/20
USPC ....... 348/175, 187, 239, 208.12, 229.1, 252, 348/253; 382/254–256, 266, 268, 269, 382/274, 275
See application file for complete search history.

(56) References Cited

U.S. PATENT DOCUMENTS

| | | |
|---|---|---|
| 7,492,938 B2 | 2/2009 | Brinson, Jr. et al. |
| 7,796,829 B2 | 9/2010 | Nguyen et al. |
| 8,014,034 B2 | 9/2011 | Hooper |
| 8,275,449 B2 | 9/2012 | White et al. |
| 8,279,325 B2 | 10/2012 | Pitts et al. |
| 8,508,612 B2 | 8/2013 | Cote et al. |
| 8,531,542 B2 | 9/2013 | Cote et al. |
| 8,786,625 B2 | 7/2014 | Cote et al. |
| 8,922,704 B2 | 12/2014 | Cote et al. |
| 9,014,504 B2 | 4/2015 | Lim et al. |
| 9,025,867 B2 | 5/2015 | Cote et al. |
| 9,077,943 B2 | 7/2015 | Lim et al. |
| 9,105,078 B2 | 8/2015 | Lim et al. |
| 9,131,196 B2 | 9/2015 | Lim et al. |
| 9,332,239 B2 | 5/2016 | Cote et al. |
| 9,661,212 B2 | 5/2017 | Oishi et al. |
| 2012/0147205 A1* | 6/2012 | Lelescu ................ G06T 3/4076 348/218.1 |
| 2013/0321675 A1 | 12/2013 | Cote et al. |
| 2015/0371111 A1 | 12/2015 | Mohamed et al. |
| 2017/0206689 A1 | 7/2017 | Eo et al. |

* cited by examiner

ND UCTIVE MICRO-CONTRAST
EVALUATION METHOD

CROSS REFERENCE TO RELATED
APPLICATIONS

This application claims the benefit of U.S. Provisional Application No. 62/468,063, filed on Mar. 7, 2017, and U.S. Provisional Application No. 62/468,874, filed on Mar. 8, 2017, both of which are incorporated herein by reference in their entireties.

BACKGROUND OF THE INVENTION

Field of the Invention

The present invention is directed generally to methods of quantifying micro-contrast and visualizing micro-contrast in images and digital video.

Description of the Related Art

Within an image, contrast may be defined as a difference in luminance and/or color that makes an object distinguishable from other features (e.g., other objects) within the image. Thus, contrast may be most visible at an edge or boundary between different objects. On the other hand, micro-contrast refers to contrast between adjacent (or nearly adjacent) pixels. Therefore, micro-contrast is not concerned with edges or boundaries. Further, while micro-contrast differs from sharpness, an image with good micro-contrast may appear sharper.

Unfortunately, some image processing techniques (e.g., physical anti-aliasing filters and/or software-based moiré pattern reduction) can result in relatively homogeneous adjacent pixels. In other words, these techniques may reduce micro-contrast within a resultant image. This problem can be further exacerbated by a color filter array ("CFA") Demosaic scheme that prioritizes high output spatial resolution over native acutance. Overlays used to visualize focus may be derived from pixel-submatrix convolution operators (like Sobel, Roberts Cross, or Prewitt) and are commonly used to overcome the problem of near-pixel homogeneity. Unfortunately, these approaches struggle to discriminate between high-frequency detail and Gaussian noise.

BRIEF DESCRIPTION OF THE SEVERAL
VIEWS OF THE DRAWING(S)

DETAILED DESCRIPTION OF THE
INVENTION

Figure 1:
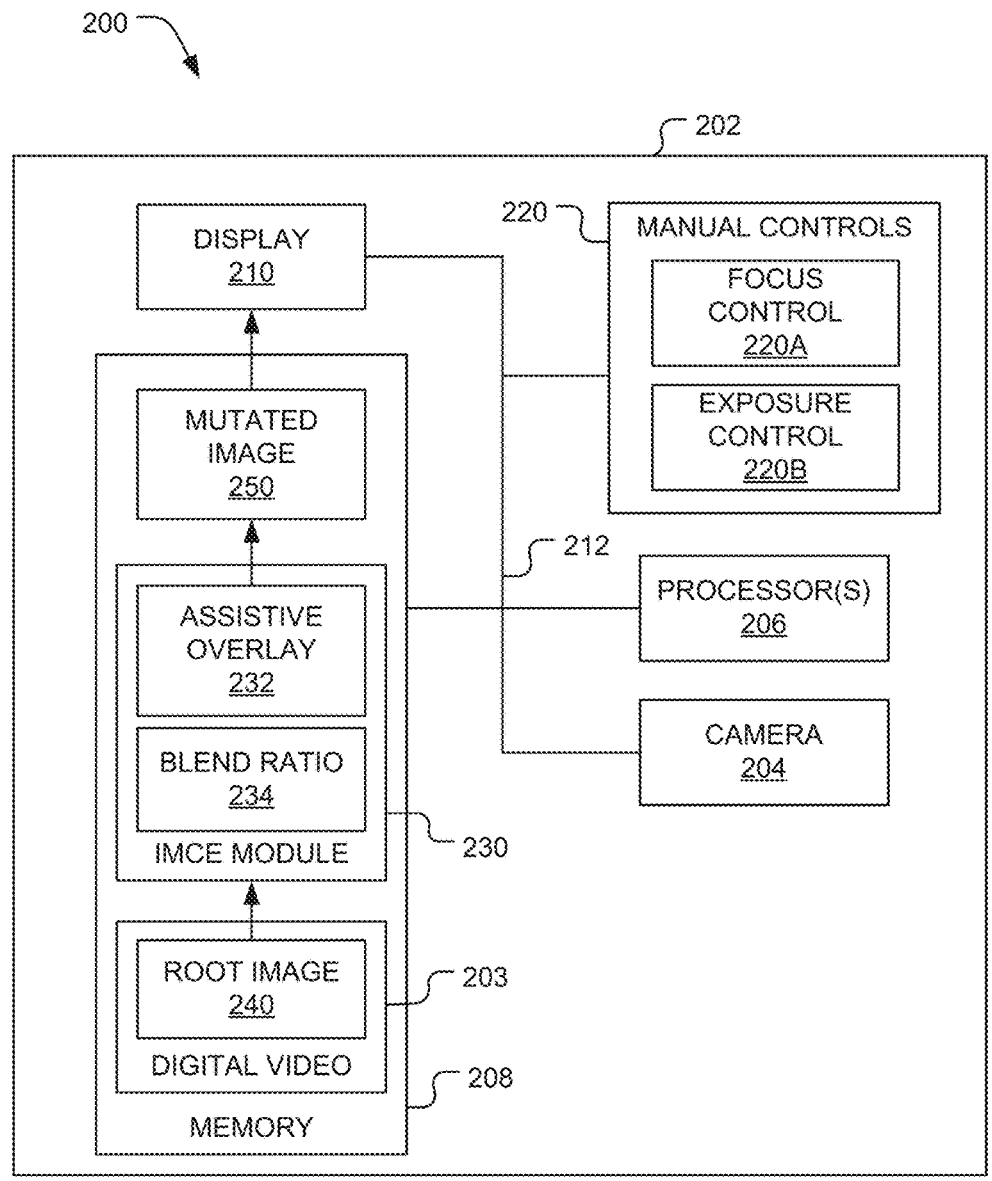
FIG. 1 is a functional block diagram of a video capture system.

FIG. 1 illustrates a video capture system 200 configured to capture digital video 203, which may be referred to as an image stream. For example, the digital video 203 may be captured and/or processed as a Real-Time Messaging Protocol ("RTMP") video stream. By way of a non-limiting example, the video capture system 200 may be implemented as a mobile communication device 140 (described below and illustrated in FIG. 4). The video capture system 200 includes a housing 202, a camera 204, one or more processors 206, memory 208, a display 210, and one or more manual controls 220. The camera 204, the processor(s) 206, the memory 208, and the display 210 may be connected together by a bus 212 (e.g., like a bus system 186 illustrated in FIG. 4).

The camera 204 is mounted on the housing 202. The camera 204 is configured to capture the digital video 203 and store that digital video 203 in the memory 208. The captured digital video 203 includes a series of root images (e.g., including a root image 240) of a scene. By way of a non-limiting example, the camera 204 may be implemented as a camera or video capture device 158 (see FIG. 4).

The processor(s) 206 is/are configured to execute software instructions stored in the memory 208. By way of a non-limiting example, the processor(s) 206 may be implemented as a central processing unit ("CPU") 150 (see FIG. 4) and the memory 208 may be implemented as memory 152 (see FIG. 4).

The display 210 is positioned to be viewed by the user while the user operates the video capture system 200. The display 210 is configured to display a preview of the digital video 203 being captured by the camera 204. By way of a non-limiting example, the display 210 may be implemented as conventional display device, such as a touch screen. The display 210 may be mounted on the housing 202. For example, the display 210 may be implemented as a display 154 (see FIG. 4). Alternatively, the display 210 may be implemented as an electronic viewfinder, an auxiliary monitor connected to the video capture system 200, and the like.

The manual control(s) 220 is/are configured to be operated by the user and may affect properties (e.g., focus, exposure, and the like) of the digital video 203 being captured. The manual control(s) 220 may be implemented as software controls that generate virtual controls displayed by the display 210. In such embodiments, the display 210 may be implemented as touch screen configured to receive user input that manually manipulates the manual control(s) 220. Alternatively, the manual control(s) 220 may be implemented as physical controls (e.g., button, knobs, and the like) disposed on the housing 202 and configured to be manually manipulated by the user. In such embodiments, the manual control(s) 220 may be connected to the processor(s) 206 and the memory 208 by the bus 212.

By way of non-limiting examples, the manual control(s) 220 may include a focus control 220A, an exposure control 220B, and the like. The focus control 220A may be used to change the focus of the digital video being captured by the camera 204. The exposure control 220B may change an ISO value, shutter speed, aperture, or an exposure value ("EV") of the digital video being captured by the camera 204.

The memory 208 stores an Inductive Micro-Contrast Evaluation ("IMCE") module 230 implemented by the processor(s) 206. In some embodiments, the IMCE module 230 may generate and display the virtual controls implementing the manual control(s) 220. Alternatively, the manual control(s) 220 may be implemented by other software instructions stored in the memory 208.

Figure 2:
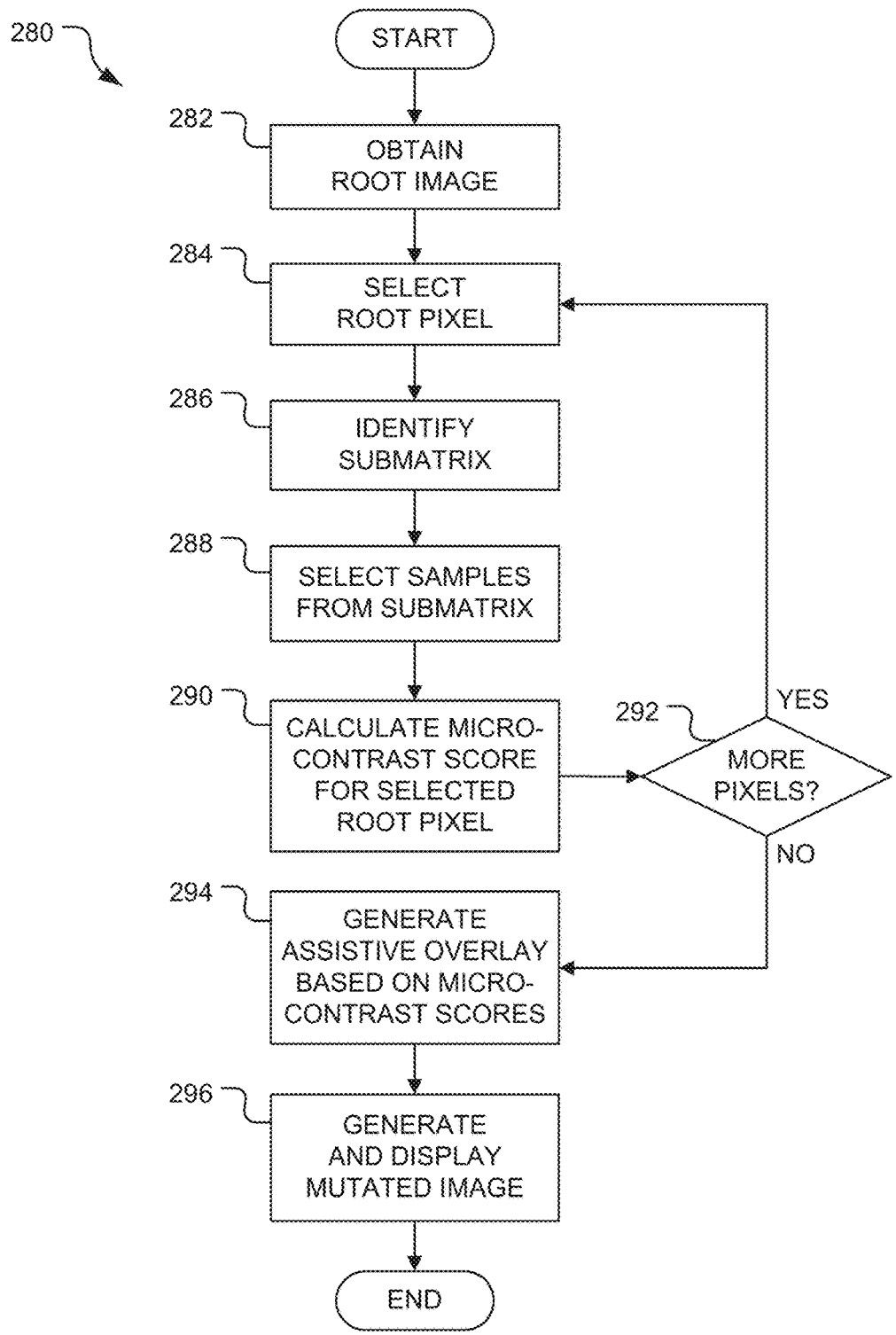
FIG. 2 is a flow diagram of a method of generating a mutated image performable by the video capture system.

FIG. 2 is a flow diagram of an IMCE method 280 performed by the IMCE module 230. Referring to FIG. 1, the IMCE method 280 (see FIG. 2) is an image analysis technique in which high frequency detail (or local area contrast) is evaluated at a per-pixel level and represented to a user visually in the form of a mutated image 250. The mutated image 250 is a blend of a selected one of the series of root images of the digital video 203 and an assistive image or overlay 232 created from the selected root image. While the assistive overlay 232 is referred to as an overlay, the assistive overlay 232 is not actually an overlay, which is a semi-transparent element or image displayed at the same time as and on top of an original image (e.g., the root image 240). Instead, the IMCE method 280 may generate a single mutated image 250 for each corresponding root image (e.g., the root image 240) within at least a portion of the digital video 203. The mutated image 250 is configured to help the user view micro-contrast within the corresponding root image. Each mutated image 250 is displayed by the display 210, instead of the corresponding root image. Thus, the mutated image 250 is not the product of a multi-image composite. For ease of illustration, the IMCE method 280 (see FIG. 2) will be described as generating the assistive overlay 232 from the root image 240.

In first block 282 (see FIG. 2), the IMCE module 230 obtains the root image 240. The root image 240 is a bitmap that may be processed by a graphics processing unit ("GPU") or CPU (e.g., the processor(s) 206).

At this point, the IMCE module 230 processes each root pixel of the root image 240 one at a time. Thus, in block 284 (see FIG. 2), the IMCE module 230 selects one of the root pixels of the root image 240 (e.g., a selected root pixel 300 illustrated in FIG. 3).

Figure 3:
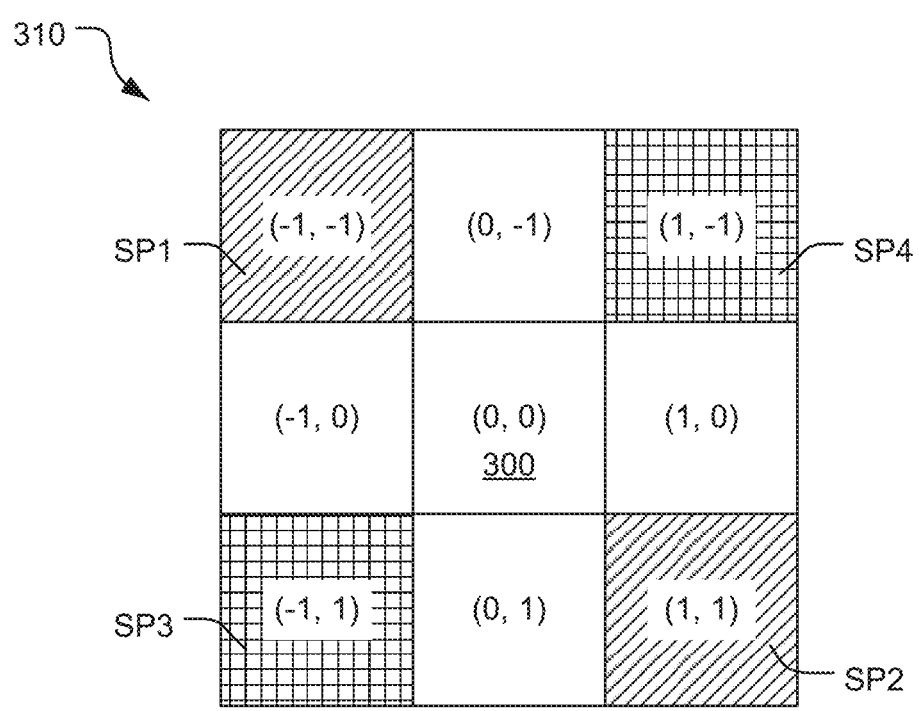
FIG. 3 is a block diagram of a submatrix used by the video capture system when performing the method of FIG. 2.

Next, in block 286 (see FIG. 2), the IMCE module 230 extracts or identifies a submatrix 310 (see FIG. 3) from the root image 240. Referring to FIG. 3, the submatrix 310 (e.g., a two-dimensional 3×3 block of pixels) includes the selected root pixel 300 at coordinate (0, 0) and its surrounding neighborhood, which includes those pixels at coordinates (−1, −1), (−1, 0), (−1, 1), (0, −1), (0, 0), (0, 1), (1, −1), (1, 0), and (1, 1) relative to the selected root pixel 300. Thus, the selected root pixel 300 at coordinate (0, 0) may be characterized as being an origin of the submatrix 310 (which includes the selected root pixel 300 and its eight surrounding neighbors).

Referring to FIG. 3, in block 288 (see FIG. 2), the IMCE module 230 (see FIG. 1) identifies or selects sample pixels SP1-SP4 from the submatrix 310. The sample pixels SP1-SP4 are least likely to be influenced by the selected root pixel 300 itself. For example, the sample pixels SP1-SP4 may include those pixels in the corners of the submatrix 310. Thus, the sample pixels SP1-SP4 are those pixels at coordinates (−1, −1), (−1, 1), (1, −1), and (1, 1) relative to the selected root pixel 300, which is at coordinate (0, 0).

In block 290 (see FIG. 2), the IMCE module 230 calculates a micro-contrast score ("MCS") representing micro-contrast. The micro-contrast score ("MCS") may be implemented as a scalar floating-point value. The micro-contrast score ("MCS") may have a value on a scale from a minimum value (e.g., zero) to a maximum value (e.g., one). In such embodiments, the minimum value may represent low micro-contrast and the maximum value may represent high micro-contrast. The following Equation 1 may be used to calculate the value of the micro-contrast score ("MCS"):

$$MCS = \min(1.25, \text{length}(\text{pixel}(-1,-1) - \text{pixel}(1,1)) + \text{length}(\text{pixel}(-1,1) - \text{pixel}(1,-1)))/1.25$$
$$= \min(1.25, \text{length}(SP1 - SP2) + \text{length}(SP3 - SP4))/1.25 \quad \text{Eq. 1}$$

Alternatively, the following Equation 2 may be used to calculate the value of the micro-contrast score ("MCS"):

$$MCS = (\text{length}(\text{pixel}(-1,-1) - \text{pixel}(1,1)) + \text{length}(\text{pixel}(-1,1) - \text{pixel}(1,-1)))/(2^*3^{0.5})$$
$$= (\text{length}(SP1 - SP2) + \text{length}(SP3 - SP4))/3.464 \quad \text{Eq. 2}$$

In Equations 1 and 2 above, the sample pixels SP1 and SP2 are a first pair of pixels along a first diagonal and the sample pixels SP3 and SP4 are a second pair of pixels along a second diagonal. In Equations 1 and 2, the length of a first pixel minus a second pixel (e.g., length(SP1-SP2)) within one of the first and second pairs is determined by subtracting the RGB color values of the second pixel from the RGB color values of the first pixel to obtain a resultant set of RGB color values. Then, the resultant RGB color values obtained for each of the first and second pairs are treated as three-dimensional coordinates and each converted into a length using the following Equation 3:

$$\text{length} = \sqrt{R^2 + G^2 + B^2} \quad \text{Eq. 3}$$

Thus, the value of length(SP1-SP2) is calculated using the following Equation 4:

$$\text{length}(SP1\text{-}SP2) = \sqrt{(R_{SP1} - R_{SP2})^2 + (G_{SP1} - G_{SP2})^2 + (B_{SP1} - B_{SP2})^2} \quad \text{Eq. 4}$$

Similarly, the value of length(SP3-SP4) is calculated using the following Equation 5:

$$\text{length}(SP3\text{-}SP4) = \sqrt{(R_{SP3} - R_{SP4})^2 + (G_{SP3} - G_{SP4})^2 + (B_{SP3} - B_{SP4})^2} \quad \text{Eq. 5}$$

In the equations above, the RGB color values may each be scaled to range from zero to one. In such embodiments, a maximum possible value of each of the length(SP1-SP2) and the length(SP3-SP4) is the square root of three. A total maximum distance may be defined as twice the square root of three ($2*3^{0.5} \approx 3.464$). Thus, the IMCE method 280 generates the micro-contrast score ("MCS") as a sum of a first distance between a first pair of vectors (length(SP1-SP2)) and a second distance between a second pair of vectors (length(SP3-SP4)) divided by the total maximum distance. Therefore, the micro-contrast score ("MCS") may be characterized as being of a percentage of the total maximum distance.

Next, referring to FIG. 2, in decision block 292, the IMCE module 230 (see FIG. 1) determines whether all of the root pixels of the root image 240 have been selected in block 284. The decision in decision block 292 is "YES," when the IMCE module 230 (see FIG. 1) has not yet selected all of the root pixels. When the decision in decision block 292 is "YES," the IMCE module 230 (see FIG. 1) returns to block 284 and selects a next root pixel from the root image 240 (see FIG. 1).

On the other hand, the decision in decision block 292 is "NO," when the IMCE module 230 (see FIG. 1) has selected all of the root pixels. When the decision in decision block 292 is "NO," the IMCE module 230 (see FIG. 1) has calculated the micro-contrast score ("MCS") for each of the root pixels in the root image 240 (see FIG. 1). Referring to FIG. 1, in block 294 (see FIG. 2), the IMCE module 230 uses the micro-contrast scores calculated for each of the root pixels to generate the assistive overlay 232 and display the mutated image 250. For example, as mentioned above, each of the micro-contrast scores may have a value on the scale from the minimum value (e.g., zero) to the maximum value (e.g., one). These values may be mapped (e.g., linearly, using lookup table, and the like) to color values. For example, the minimum value may be mapped to a first overlay color (e.g., blue), the maximum value may be mapped to a second overlay color (e.g., green), and values between the minimum and the maximum values may be mapped to a blend of the first and second overlay colors. Thus, in the assistive overlay 232, low contrast areas in the first overlay color (e.g., blue) and high contrast areas may be shown in the second overlay color (e.g., green) with other levels of contrast interpolated (e.g., linear) between the first and second overlay colors. Thus, the assistive overlay 232 may include a linear blend of the first and second overlay colors (e.g., blue and green). In the mutated image 250, the first overlay color (e.g., blue) visualizes the broader focal plane in the root image 240 and the second overlay color (green) visualizes high micro-contrast (or critical focus) in the root image 240.

In block 296 (see FIG. 2), the IMCE module 230 creates the mutated image 250 by blending the assistive overlay 232 and the root image 240 and instructs the display 210 to display the mutated image 250 (e.g., as a preview of the root image 240).

For example, the IMCE module 230 may use a blend ratio 234 to blend the assistive overlay 232 and the root image 240 together. The blend ratio 234 determines how much the assistive overlay 232 and the root image 240 each contribute to the mutated image 250. The blend ratio 234 may be characterized as including first and second weights that sum to one. The assistive overlay 232 may be weighted by the first weight and the root image 240 may be weighted by the second weight. The pixels of the assistive overlay 232 are blended with the root pixels by applying the first weight to each of the pixels of the assistive overlay 232 and the second weight to each of the root pixels. Then, the weighted pixels of the assistive overlay 232 are added to the weighted root pixels to obtain the mutated pixels. Thus, each pixels of the assistive overlay 232 may be blended with a corresponding root pixel using a per-pixel linear-mix operation.

Optionally, only those portions of the assistive overlay 232 having a micro-contrast score greater than or equal to a minimum evaluation threshold value may be blended with the root image 240. Thus, portions of the assistive overlay 232 having a micro-contrast score less than the minimum evaluation threshold value may be omitted from the mutated image 250. For any omitted portion(s) of the assistive overlay 232, the corresponding root pixel is used in the mutated image 250. The minimum evaluation threshold value may vary based on desired sensitivity.

The assistive overlay 232 visualizes the entire focal plane and may appear as colored lines drawn on top of regions of the root image 240 (e.g., assigned micro-contrast scores greater than or equal to the minimum evaluation threshold value). Unlike prior art colorized edge-detection overlays (often referred to as "focus peaking"), the IMCE module 230 does not use a single arbitrary color to visualize focus or micro-contrast. Instead, the IMCE module 230 may paint a linear blend of the first and second overlay colors (which are the assistive overlay 232) on the root image 240.

The assistive overlay 232 may be challenging to see if the underlying root image 240 is chromatically vibrant. Optionally, to make the assistive overlay 232 easier to see, the IMCE module 230 may generate a global desaturation of the root image 240 (or a desaturated version of the root image 240). Then, the IMCE module 230 creates the mutated image 250 by blending the assistive overlay 232 with the desaturated version of the root image 240.

Then, the IMCE method 280 (see FIG. 2) terminates.

Referring to FIG. 3, the IMCE method 280 (see FIG. 2) evaluates micro-contrast without convolving the entire neighborhood of the selected root pixel 300. By considering only the sample pixels SP1-SP4, the IMCE method 280 (see FIG. 2) effectively evaluates local area contrast without the need to de-noise the image buffer before processing. This approach also largely negates the influence of Gaussian noise because the thresholding can be much lower. In other words, by using the sample pixels SP1-SP4 instead of prior art pixel-submatrix convolution operators (like Sobel, Roberts Cross, or Prewitt), the IMCE method 280 (see FIG. 2) is able to discriminate between high-frequency detail and Gaussian noise.

Referring to FIG. 1, the IMCE method 280 (see FIG. 2) is not a means of image enhancement and does not introduce additional micro-contrast into the root image 240. Instead, the IMCE method 280 (see FIG. 2) is a single-pass operation that creates a micro-contrast map (the assistive overlay 232) that is capable of representing unembellished micro-contrast levels.

The assistive overlay 232 helps the user visualizes degrees of micro-contrast, not focus. Therefore, the assistive overlay 232 (or micro-contrast map) generated by the IMCE method 280 (see FIG. 2) is not intended to be used for focus acquisition.

The micro-contrast score ("MCS") is generated on a per-pixel basis and is always subject to user-interpretation. Neither the video capture system 200 nor the IMCE method 280 (see FIG. 2) attempts to interpret either the assistive overlay 232 or the micro-contrast scores for the user. The user is free to interpret the assistive overlay 232 as being indicative of focus, chromatic aberration, or out-of-focus aperture artifacts.

Using the assistive overlay 232, the user may adjust the manual control(s) 220 (e.g., the focus control 220A) or other parameters to improve the micro-contrast in the root image 240. For example, the user may adjust the lighting and view the assistive overlay 232 (e.g., in a preview) using the display 210. Then, the user may view the assistive overlay 232 to see if the change in lighting improved the micro-contrast in the current root image 240.

Mobile Communication Device

Figure 4:
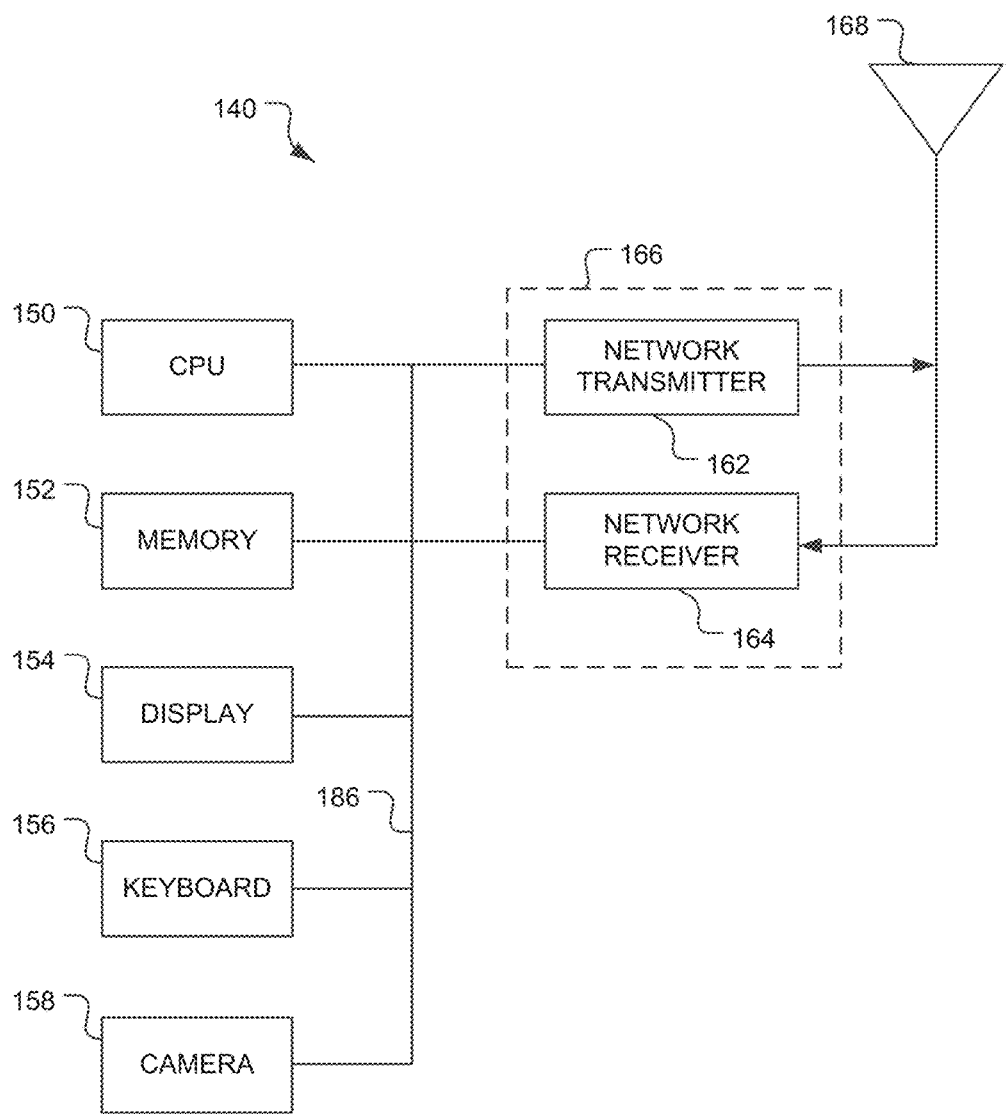
FIG. 4 is a functional block diagram illustrating an exemplary mobile communication device that may be used to implement the video capture system.

FIG. 4 is a functional block diagram illustrating a mobile communication device 140. The mobile communication device 140 may be implemented as a cellular telephone, smart phone, a tablet computing device, a self-contained camera module (e.g., a wired web camera or an Action Camera module), and the like. By way of a non-limiting example, the mobile communication device 140 may be implemented as a smartphone executing IOS or Android OS. The mobile communication device 140 may be configured to capture the digital video 203 (see FIG. 1) and process the digital video 203 as a RTMP protocol video stream.

The mobile communication device 140 includes the CPU 150. Those skilled in the art will appreciate that the CPU 150 may be implemented as a conventional microprocessor, application specific integrated circuit (ASIC), digital signal processor (DSP), programmable gate array (PGA), or the like. The mobile communication device 140 is not limited by the specific form of the CPU 150.

The mobile communication device 140 also contains the memory 152. The memory 152 may store instructions and data to control operation of the CPU 150. The memory 152 may include random access memory, ready-only memory, programmable memory, flash memory, and the like. The mobile communication device 140 is not limited by any specific form of hardware used to implement the memory 152. The memory 152 may also be integrally formed in whole or in part with the CPU 150.

The mobile communication device 140 also includes conventional components, such as a display 154 (e.g., operable to display the mutated image 250), the camera or video capture device 158, and keypad or keyboard 156. These are conventional components that operate in a known manner and need not be described in greater detail. Other conventional components found in wireless communication devices, such as USB interface, Bluetooth interface, infrared device, and the like, may also be included in the mobile communication device 140. For the sake of clarity, these conventional elements are not illustrated in the functional block diagram of FIG. 4.

The mobile communication device 140 also includes a network transmitter 162 such as may be used by the mobile communication device 140 for normal network wireless communication with a base station (not shown). FIG. 4 also illustrates a network receiver 164 that operates in conjunction with the network transmitter 162 to communicate with the base station (not shown). In a typical embodiment, the network transmitter 162 and network receiver 164 are implemented as a network transceiver 166. The network transceiver 166 is connected to an antenna 168. Operation of the network transceiver 166 and the antenna 168 for communication with a wireless network (not shown) is well-known in the art and need not be described in greater detail herein.

The mobile communication device 140 may also include a conventional geolocation module (not shown) operable to determine the current location of the mobile communication device 140.

The various components illustrated in FIG. 4 are coupled together by the bus system 186. The bus system 186 may include an address bus, data bus, power bus, control bus, and the like. For the sake of convenience, the various busses in FIG. 4 are illustrated as the bus system 186.

The memory 152 may store instructions executable by the CPU 150. The instructions may implement portions of one or more of the methods described above (e.g., the IMCE method 280 illustrated in FIG. 2). Such instructions may be stored on one or more non-transitory computer or processor readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A video capture system comprising:
   memory storing instructions;
   a camera configured to capture digital video and store the digital video in the memory, the digital video comprising a series of root images; and
   at least one processor configured to execute the instructions, when executed, the instructions causing the at least one processor to (a) obtain a selected one of the series of root images, the selected root image comprising root pixels each associated with color values, (b) assign a plurality of micro-contrast scores one each to each of the root pixels, (c) generate an assistive image based on the plurality of micro-contrast scores, and (d) blend the assistive image with the selected root image to obtain a mutated image, assigning the plurality of micro-contrast scores comprising:
   selecting each of the root pixels one at a time as a selected root pixel,
   for each selected root pixel, identifying a submatrix centered at the selected root pixel and comprising a plurality of corners and a plurality of sample pixels positioned one each at each of the corners, and
   calculating a selected one of the plurality of micro-contrast scores for each selected root pixel, the selected micro-contrast score being calculated based on the color values associated with only the plurality of sample pixels of the submatrix identified for the selected root pixel.

2. The video capture system of claim 1, further comprising:
a display, the instructions causing the at least one processor to instruct the display to display the mutated image to a user.

3. The video capture system of claim 1, wherein for each selected root pixel, the plurality of sample pixels of the submatrix identified for the selected root pixel comprise first, second, third, and fourth sample pixels, the first and second pixels are along a first diagonal of the submatrix identified for the selected root pixel, the third and fourth pixels are along a second diagonal of the submatrix identified for the selected root pixel, and the selected micro-contrast score is calculated for the selected root pixel by:
subtracting the color values of the second sample pixel from the color values of the first sample pixel to obtain first resultant color values,
calculating a first length from the first resultant color values,
subtracting the color values of the fourth sample pixel from the color values of the third sample pixel to obtain second resultant color values,
calculating a second length from the second resultant color values,
adding the first and second lengths to obtain a sum, and dividing the sum by a total maximum distance value.

4. The video capture system of claim 3, wherein the first resultant color values comprise a first red value, a first green value, and a first blue value,
the first length is calculated from the first resultant color values by calculating a square root of a first total of the first red value squared, the first green value squared, and the first blue value squared,
the second resultant color values comprise a second red value, a second green value, and a second blue value, and
the second length is calculated from the second resultant color values by calculating a square root of a second total of the second red value squared, the second green value squared, and the second blue value squared.

5. The video capture system of claim 1, wherein the submatrix identified for each selected root pixel is three of the root pixels by three of the root pixels.

6. The video capture system of claim 1, wherein the plurality of micro-contrast scores are numerical values on a scale ranging from a minimum value to a maximum value, and
the assistive image is generated by mapping the minimum value to a first color, the maximum value to a second color, and those of the numerical values between the minimum and maximum values to a blend of the first and second colors.

7. The video capture system of claim 6, wherein the blend of the first and second colors is a linear blend that maps those of the numerical values falling between the minimum and maximum values to a linear combination of the first and second colors determined using linear interpolation.

8. The video capture system of claim 1, wherein the instructions cause the at least one processor to desaturate the selected root image before the assistive image is blended therewith to obtain the mutated image.

9. The video capture system of claim 1, wherein generating the assistive image based on the plurality of micro-contrast scores comprises omitting from the assistive image those of the plurality of micro-contrast scores that fail to exceed a threshold value.

10. A method comprising:
obtaining, with at least one processor, a selected root image from a digital video, the selected root image comprising root pixels each associated with color values;
until each of the root pixels has been selected, (a) selecting, with the at least one processor, one of the root pixels, (b) identifying, with the at least one processor, a submatrix centered at the selected root pixel and comprising a plurality of corners and a plurality of sample pixels positioned one each at each of the corners, and (c) calculating, with the at least one processor, a micro-contrast score for the selected root pixel based on the color values associated with only the plurality of sample pixels;
generating, with the at least one processor, an assistive image based on a plurality of micro-contrast scores comprising the micro-contrast score calculated for each of at least a portion of the root pixels;
blending, with the at least one processor, the assistive image with the selected root image to obtain a mutated image; and
displaying, with a display device, the mutated image.

11. The method of claim 10, wherein the plurality of sample pixels comprise first, second, third, and fourth sample pixels, the first and second pixels are along a first diagonal of the submatrix, the third and fourth pixels are along a second diagonal of the submatrix, and the micro-contrast score is calculated for the selected root pixel by:
subtracting the color values of the second sample pixel from the color values of the first sample pixel to obtain first resultant color values,
calculating a first length from the first resultant color values,
subtracting the color values of the fourth sample pixel from the color values of the third sample pixel to obtain second resultant color values,
calculating a second length from the second resultant color values,
adding the first and second lengths to obtain a sum, and dividing the sum by a total maximum distance value.

12. The method of claim 11, wherein the first resultant color values comprise a first red value, a first green value, and a first blue value,
the first length is calculated from the first resultant color values by calculating a square root of a first total of the first red value squared, the first green value squared, and the first blue value squared,
the second resultant color values comprise a second red value, a second green value, and a second blue value, and
the second length is calculated from the second resultant color values by calculating a square root of a second total of the second red value squared, the second green value squared, and the second blue value squared.

13. The method of claim 10, wherein the submatrix is three of the root pixels by three of the root pixels.

14. The method of claim 10, wherein the plurality of micro-contrast scores are numerical values on a scale ranging from a minimum value to a maximum value, and
the assistive image is generated by mapping the minimum value to a first color, the maximum value to a second color, and those of the numerical values between the minimum and maximum values to a blend of the first and second colors.

15. The method of claim 14, wherein the blend of the first and second colors is a linear blend that maps those of the numerical values falling between the minimum and maximum values to a linear combination of the first and second colors determined using linear interpolation.

16. The method of claim 10, further comprising:
desaturating, with the at least one processor, the selected root image before the assistive image is blended therewith to obtain the mutated image.

17. The method of claim 10, wherein the portion of the root pixels includes only the root pixels for which the micro-contrast score calculated for the root pixel exceeds a threshold value.

18. A method comprising:
until a plurality of mutated images have been displayed, (a) obtaining, with at least one processor, a selected root image from a digital video comprising a plurality of consecutive root images, the selected root image comprising root pixels each associated with color values, (b) assigning, with the at least one processor, a plurality of micro-contrast scores one each to each of the root pixels, (c) generating, with the at least one processor, an assistive image based on the plurality of micro-contrast scores, (d) blending, with the at least one processor, the assistive image with the selected root image to obtain a new one of the plurality of mutated images, and (e) displaying, with a display device, the new mutated image,
wherein assigning the plurality of micro-contrast scores comprises until each of the root pixels has been selected, (i) selecting, with the at least one processor, one of the root pixels, (ii) identifying, with the at least one processor, a submatrix centered at the selected root pixel and comprising a plurality of corners and a plurality of sample pixels positioned one each at each of the corners, and (iii) calculating, with the at least one processor, one of the plurality of micro-contrast scores for the selected root pixel based on the color values associated with only the plurality of sample pixels.

19. The method of claim 18, further comprising:
desaturating, with the at least one processor, the selected root image before the assistive image is blended therewith to obtain the new mutated image.

* * * * *